INVENTOR.
Jerome H. Lemelson
BY

United States Patent Office 3,472,723
Patented Oct. 14, 1969

3,472,723
CONTAINER MANUFACTURE
Jerome H. Lemelson, 85 Rector St.,
Metuchen, N.J. 08840
Filed Oct. 14, 1964, Ser. No. 403,861
Int. Cl. B29b *5/04;* B32b *31/04*
U.S. Cl. 156—500        13 Claims

ABSTRACT OF THE DISCLOSURE

An apparatus is provided for forming unit containers of sheet material. The apparatus deforms a flat sheet of material with one or more indentations and coats surrounding flat areas of the sheet with a sealing material. Thereafter, portions of the deformed and coated sheet are either die-cut to provide individual container sections thereof or are sealed to a second sheet after which such die-cutting is effected. The sealing material is automatically applied to selected areas of the sheet which become flange portions of the finished container which flange portions may thus be easily bonded or sealed to other flat material upon completion of the container.

---

This invention sets forth an apparatus and method for selectively coating predetermined areas of sheet material on a continuous basis and selectively forming and severing predetermined areas of said sheet such that the coated areas thereof are disposed along predetermined portions of the formed articles severed from the sheet. In particular, the apparatus defined therein is operable for producing containers or components of containers which are selectively coated with adhesive or sealable material along predetermined areas such as borders of the container or component whereby said container or component may be easily secured to another surface or component to define a packaging assembly. Frequently in the fabrication of packaging assemblies adhesive or seat sealable materials are coated on an entire surface of a sheet prior to forming or cutting and define a lining, not only for the areas thereof which abut another surface of the packaging assembly and are bonded or welded thereto, but also the interior surface of the container bounded thereby. While for certain applications such a lining may be desirable, there are many applications where it may not only contaminate or otherwise affect the material held within the container so lined but also defines a coating on a surface on which it performs no useful function. In other words, such coating may be merely a waste of material and is provided simply because the sheet stock from which the container or component is fabricated is available only with its entire surface so coated.

Accordingly, it is a primary object of this invention to provide an improved apparatus and method for fabricating packaging components and assemblies.

Another object is to provide an apparatus and method for predeterminedly coating selected areas of a sheet and automatically fabricating said sheet in a manner to provide said selected areas as selected portions of the surfaces of articles produced from said sheet.

Another object is to provide an improved apparatus for fabricating articles of sheet material and including means for bonding or welding said articles in the form of a coating material applied to substantially just the areas of the articles to be welded or bonded.

Another object is to provide apparatus for automatically fabricating container components by deforming sheet material and selectively applying coatings to selected areas of said sheet material prior to forming and utilizing same for assembling articles formed thereof with other packaging components whereby the necessity of coating the entire surface of the sheet material is eliminated.

Another object is to provide an improved apparatus for fabricating packaging components which may be easily assembled thereafter by hand to retain a product or premium applied by personnel in a store or distribution center without resort to complex equipment.

Another object is to provide improved methods for assembling premiums and the like with conventional product containers without the need for modifying the container.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
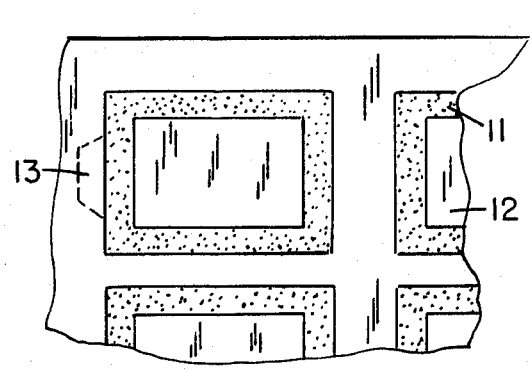
FIG. 1 is a plan view of a fragment of a sheet material prior to forming by means of the apparatus of this invention.
Figure 2:
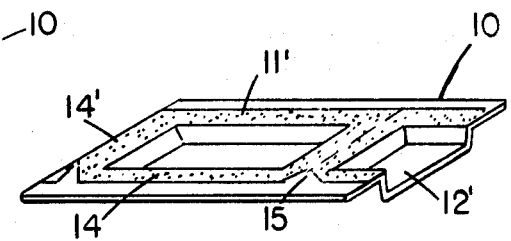
FIG. 2 is an isometric view of a portion of a modified form of the sheet of FIG. 1 which has deformations therein.

There is shown in FIG. 1 a sheet material 10 having portions of one surface thereof coated with an adhesive or sealable material prior to fabrication of the sheet into individual articles or components. The coated formations 11 are illustrated in FIG. 1 as circumscribing respective rectangular portions 12 of the sheet which are formed as cavities or indentations 12' in said sheet as illustrated in FIG. 2, preferably after the application of the coating material 11 thereto. A variety of sheet and coating materials may be so fabricated in a variety of shapes to define individual articles such as the pan-like containers of FIG. 3 which are severable from said sheet during or after the formation of the indentations 12' in the sheet and are rendered, as a result of said coating, easily weldable or bondable to similar or otherwise shaped packaging components along the portion or portions thereof so coated.

Figure 3:
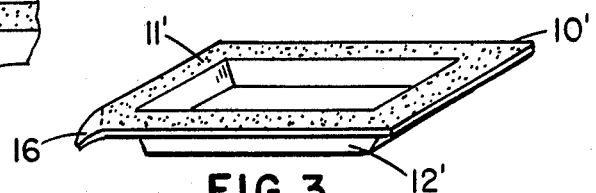
FIG. 3 is an isometric view of an open container formed from the sheet of FIG. 2.

FIG. 3 illustrates a pan-like formation 10' severed from the sheet 10 having a flange 11', the major portion of the surface of which is coated with an adhesive material. Compression of the flange 11' against the surface of another article or container will result in its adherence thereto if the coating is adhesive in a tacky or bondable condition.

In one form of the invention, the adhesive material 11 coating the flange 11' of the container 10' may comprise a non-tacky adhesive such as rubber cement or latex adhesive which will only bond to itself. Thus, if the surface against which flange 11' is compressed is also coated with such an adhesive, the two will bond together and be retained in an assembly, perhaps with an article disposed therebetween. In such an application, the sheet material of which container 10' is made may comprise a transparent plastic such as polystyrene, polyvinylchloride or other suitable plastic which may have the deformation 12' provided therein by thermoforming said sheet on a continuous basis after or prior to the application of the adhesive material thereto.

In another form of the invention, the sheet 10 may be made of a metal such as aluminum or steel and the coating material 11 may comprise an adhesive as described or a heat sealable plastic for bonding the component 10' to another surface by the application of heated dies thereto. Such a system would permit the rapid assembly of the components and rapid disassembly thereof by peeling the two apart.

In FIG. 1, the notation 13 refers to a tab which may be formed at one end of the container severed from the sheet 10 by die cutting beyond the border of the area coated with adhesive 11, said tab being operative to effect removal of the container component 10' from the surface to which it is applied by a pulling action. Since the tab 13 is not adhesively coated, it may be easily lifted off the surface engaging the adhesively coated flange portion 11' of the container.

In FIG. 2, portions 15 of one border 14 extending along the indentation in the sheet are void of adhesive material and form, when the container or sub-housing 10' is severed from the main sheet as illustrated in FIG. 3, a corner tab 16 which may be bent or deformed as illustrated when the container 10' is formed and may serve as means for initiating a peeling action therefor away from the container or card against which member 10' is applied by grasping said tab between the thumb and forefinger of the hand. If the coating material 11 is a heat sealable plastic, the area defined by tab 16 may be left unsealed against the surface which flange 11' is sealed to so as to define an easily liftable tab portion of the flange to initiate the peeling action.

Figure 4:
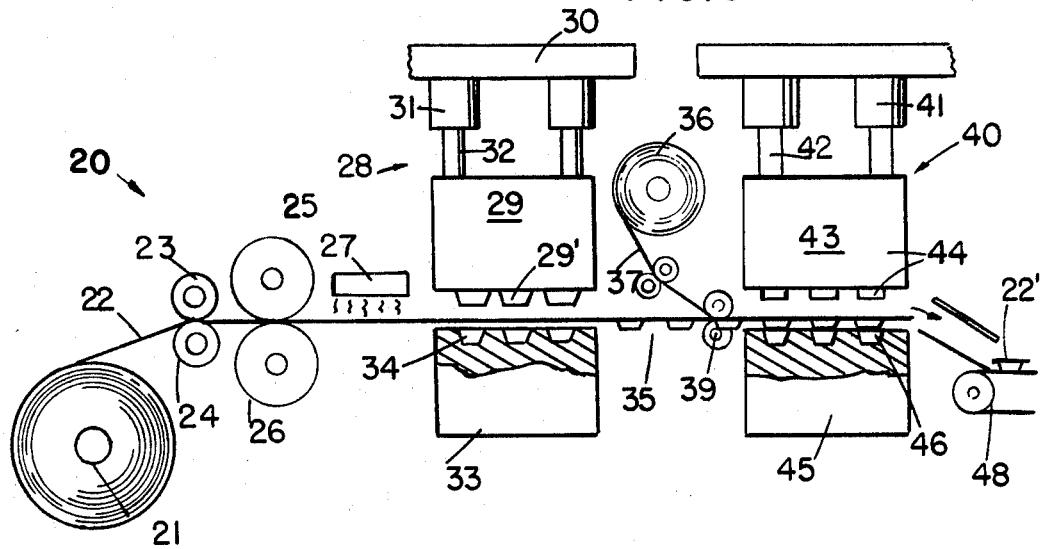
FIG. 4 is a side view showing a machine arrangement for forming articles of the type illustrated in FIG. 3.

FIG. 4 illustrates apparatus for automatically and rapidly producing containers or container components of the type illustrated in FIG. 3, it being noted that such components may have a variety of different shapes and that the apparatus so illustrated may be applicable to the production of a variety of different articles having selected portions of their surfaces so coated.

A first sheet material 22 corresponding to the sheet 10 of FIG. 1 is received from a coil formation 21 thereof and is fed to the bite of a plurality of power driven rolls 23 and 24 and then to a printing means including a first roller 25 against which sheet 22 is compressed by a second roller 26. Roller 25 is operative to apply an adhesive or heat sealable plastic coating material to selected areas of the upper surface of 22 such as the areas illustrated in FIG. 1. Thereafter the sheet is passed beneath radiant heating and/or blowing means 27 for rapidly drying the coating so applied. Beyond 27 the sheet is passed through a forming machine 28 which forms indentations 22' therein such as pan or cup-shaped indentations each of which is surrounded by a flange portion which is at least partly, if not completely, coated with the material applied by means of roller 25.

Further power operative rollers 39 disposed beyond the forming machine 28 engage sheet 22 along its lateral borders and help feed a further sheet 37 such as a release paper across the top of sheet 22 which becomes bonded thereto by means of the adhesive disposed thereon by 25, assuming that the drying means 27 is not operative to completely dry the adhesive or is heat sealed to said sheet along only preselected portions of the coating so applied. The sheet 37 is fed from a roll supply 36 thereof and may be eliminated if the coating material is either dried non-tacky rubber cement or the like or a selectively applied heat sealable plastic.

Beyond press 28 is situated a second press 40 which is operative to score or sever individual containers from the main sheet which may thereafter be stacked or otherwise packaged prior to final assembly thereof with another article or container.

The apparatus of FIG. 4 is subject to certain variations and simplifications depending on the form of the articles or containers fabricated thereby. For example, if rubber cement or heat sealable plastic are coated on the selected areas 11' of the sheet, said sheet may be formed and die cut into individual articles in the press 28, thereby eliminating all components and apparatus beyond press 28 with the exception of means for stacking, nesting or otherwise packaging the individual formations severed from the main sheet or groups thereof.

Forming machine 28 is illustrated as having a reciprocating press head 29 movable towards and away from a press base 33 by a plurality of lineal actuators 31 secured to an overhead frame or base 30 and having respective rams 32 secured to the upper end of 29. Press dies 29' protrude from the lower end of 29 and cooperate with cavities 34 in the press base 33 in forming sheet 22 with a plurality of identations provided, for example, in the sheet areas 12 illustrated in FIG. 1. The forming machine 28 may be a conventional stamping press which is operative to reciprocate its dies against sheet 22 while the latter is maintained stationary and prepositioned between the bed 33 and head 29 so that the indentations will be formed in predetermined locations with respect to the adhesive or heat sealable material applied thereto. The press 28 may be also operative to move the head 29 in the direction of movement of sheet 22 as the latter is fed while said head also reciprocates. In other words, formations of sheet 22 may be effected on-the-fly whereby the intermittent sheeting thereof will not be necessary.

Sheet cutting machine 40 includes a reciprocating head having a plurality of cutting dies 44 which are projectable thereby in synchronization with movement of the sheet against portions thereof surrounding the cavities so as to sever and/or score individual articles or containers from the sheet. Recesses 46 in the bed 45 of the cutting die press 40 serve to receive the cavity formations 22' therein and to prevent their deformation during the cutting action.

After the individual pan or cup-like formations 22' or groups thereof have been severed from the main sheet, they may be ejected by a blast of air introduced at the side of the press 40 onto a shoot leading to a conveyor 48 or other means operative to collect and/or stack said articles.

Notation 41 refers to a plurality of lineal actuators having shafts 42 connected to the upper ends of the die head 43, which actuators are synchronized in their operation to the movement of the sheet as are the actuators 31 of the apparatus 28.

Certain variations in the apparatus of FIG. 4 are noted including replacement of a reciprocating die press such as the apparatus 28 with a thermoforming machine such as a vacuum forming and/or pressure forming apparatus operative on a thermoplastic polymeric sheet comprising 22 to form cup-like formations of the type illustrated therein after coating portions of said sheet with an adhesive as described.

It is also noted that the sheet 22 may be fed from a continuous forming means therefor rather than the illustrated coil of said sheet, such as an extruder or rolling mill as may sheet 37.

Methods of fabricating packaging assemblies of the types hereinabove described include the following procedures:

(I) In an assembly employing the use of an adhesive such as rubber cement, latex or any adhesive which will become substantially non-tacky after application to a surface but will bond to a coating of a similar adhesive on another surface and wherein said adhesive is provided as two coatings, one on each container component, the main product container is first coated on the area thereof adapted to receive the sub-container 43 with such an adhesive which is allowed to dry thereon. The sub-container 43 is formed of thin sheet material with its flange coated with an adhesive material similar to the material coating the main product container and said flange adhesive is allowed to form a non-tacky coating thereon. A plurality of such sub-containers may thus be stacked or nested one inside the other for storage until needed since the adhesive on the flange is non-tacky and will not adhere to surfaces not similarly coated. Thus the upper coated surface of the flange of one sub-container will engage the non-coated under surface of the sub-container nesting therein without the two containers adhering together.

When it is desired to apply a premium to the main product container, one of the sub-containers is removed from the nested array thereof, a premium is inserted therein and the coated flange is pressed against the area of the main product container similarly coated with adhesive which is sensitive to the adhesive on said sub-container flange. The two surfaces adhere together retaining the sub-container against the main product container with the premium sealed therebetween.

The main product container may comprise a paperboard or molded plastic box, molded bottle, metal can, bag or the like having a selected area of its outer surface coated with adhesive of the type described, prior to, during or after fabrication and filling of the container.

(II) If a label is affixed to the main product container, the described pressure sensitive adhesive may be coated directly on the label by roller or spray application thereto at the same time said label is printed. After the label is affixed to the main product container, the sub-housing may be affixed thereto and held with a premium disposed therein in assembly with the main product container by pressing the coated flange thereof against the coated surface of the label.

(III) In a packaging assembly employing a tacky, pressure sensitive adhesive to retain the flange of the sub-housing against the main product container, the coating of pressure sensitive adhesive may be applied to either said sub-housing flange or a selected area of the surface of the main product container, or label affixed thereto. When so applied, it will be preferable to cover the tacky adhesive with a protective overlay of plastic or paper such as wax paper which is readily peeled off the adhesive coated surface when it is desired to assemble same with the other packaging component by pressing the two together, after the premium has been placed therebetween.

(IV) In a further system applicable to packaging assemblies of the type described, the surface of the main product container adapted to receive and support the flange of the sub-housing may be pre-coated with a plastic such as an epoxy resin in an uncured condition or the surface of the flange of the sub-housing so coated while the other surface to be engaged therewith is coated with a catalyst or material containing a catalyst operative to cure the resin upon mixing of the two by compression of the two surfaces together: Homopolymerization of the epoxy coating may be effected upon release of conventional primary, secondary or tertiary amino catalysts from a filler or a porous plastic such as Porelon coating the other surface when the two are compressed together. Various so called "hardeners" are also known for epoxy resins which will copolymerize the resin when introduced therein. Such hardeners may be retained against one of the surfaces as a tacky coating protected by a peelable release paper covering or held in the cells of a thin coating of micro-porous plastic such as Porelon manufactured by the S. C. Johnson & Sons of Racine, Wis. Compression of the Porelon coating will cause it to release the hardener or catalyst upon pressing the two components together which will admit the catalyst or hardener to the epoxy coating resulting in the eventual curing of the plastic into a hard bonding layer for holding the packaging assembly together. It is briefly noted that both plastic and catalyst containing coatings may be protected by release papers or plastic films applied thereto and peelable or otherwise operative to permit combining the plastic and hardener upon compressing the two surfaces together and that a system as so described may be applicable for securing various precoated articles together by compressively abutting said articles in the areas where they are so coated.

Respective plastic and catalyst or hardener containing coatings may be applied to respective portions of the surfaces of both articles by first applying said coatings to a sheet of silicone coated release paper, cutting said sheet to sections defining areas to be coated, applying the tacky coated side of the paper to the surface to receive the coating, and when desired to assemble the two articles, peeling off the release paper while retaining the coatings against the surfaces of the articles. Thereafter, the articles are compressed together in the areas so coated to cause the hardener to mix with and cure the resin.

The sheet fabricating apparatus illustrated in FIG. 4 may also be utilized per se or as modified as set forth hereinbelow for the automatic manufacture of articles of multiple sheets of material by bonding or sealing periphery or edge border areas of two sheets together. Various articles may thus be automatically fabricated with openings provided between the two sheets for access to the interior volume defined by the sealed sheets or totally sealed border areas to serve as containers or inflatable enclosures. Modifications to the apparatus of FIG. 4 and method of fabricating sheet materials described are noted as follows:

(I) The apparatus of FIG. 4 may be modified to accommodate sheet materials other than sheets made of rigid thermoplastic polymers such as rigid acetate, vinyl, propionate, styrene or the like. For example, metal sheet of foil may be stamped to shape and flange bonded or welded by means such as illustrated in FIG. 4 or modifications thereto. Also various flexible materials such as cloth, non-woven fabrics, felt and flexible plastic sheet may be heat formed or merely fabricated into a plurality of flat articles with their entire border portions or selected portions of the border areas of said sheets engaging each other being adhesively bonded, welded or heat sealed together on an automatic basis by modification to the apparatus of FIG. 4.

(A) In a first modified form of the invention, a first sheet 22 of flexible material such as cloth, felt, non-woven fabric, etc., is fed from a roll supply or stack of individual sheets thereof through a roller coating means 26 which coats selected areas such as strip areas defining the border area of the article to be fabricated. The forming press 29 is not operated but a second sheet 37 of the same or a different material is fed to the bite of rollers 39 engaging the two sheets together in a manner to cause those areas defined by the adhesive coated on the upper surface of sheet 22 to become adhesively bonded together. As stated, the coatings applied by rollers 26 may comprise adhesive which remains tacky until the two sheets are engaged together and sets or is dried by heat thereafter to totally enclose an area inward of the bonded area after which press 43 is operative to sever the bonded portions of the sheets. The adhesive may also be applied by roller means 26, in an open loop formation or partly removed by the die cutting press 40 so as to provide a plurality of flat articles such as pouches with one or more openings therein. Heating means 27 will thus be eliminated.

(B) Two of the same or different sheet materials as hereinabove described may be fabricated into a plurality of flat or shaped wall articles by electronically welding or heat sealing selected areas as defined, for example, by those areas, such as 11 of FIG. 1, of the sheet 22 which have been coated with heat sealable plastic. Assuming that sheet 22 is metal foil, cloth or felt or other material which is not ordinarily heat sealable or electronically weldable, roller coating press 26 may be used to apply heat sealable plastic to selected areas thereof to be bonded or welded to sheet 37. If the latter, sheet 37, is heat sealable or weldable plastic or is coated entirely with such a plastic (such as vinyl chloride, polyethylene, etc.) then press 43, or another apparatus disposed between rollers 39 and press 43, may comprise automatic heat sealing means and the apparatus will necessarily include means for synchronizing operation of the heat sealing or welding apparatus with the feed of the sheet or detection of the coated areas of sheet 22 so as to cause the press 43 to advance against the abutted sheets and apply heat sealing dies in alignment with the areas so coated with heat sealable plastic so as to heat seal or weld same together. As part of the same sealing apparatus or situated downstream thereof, a cutting press 43 may be operative to die cut the portions of the sheets defined by predetermined sealed areas thereof and preferably through or just exterior of the sealing line or lines defining the borders of the articles. Registration of coated sealing material in the heat sealing and die cutting presses or rollers may be effected by photoelectric cells detecting marks applied to the borders or border of sheet 22 by the roller printing press 26 or adhesive application rollers. It is also noted that a printing press such as a roller printer may be disposed between powered rollers 23, 24 and adhesive application rollers 26 for decorating either or both surfaces of sheet 22 prior to applying the adhesive thereto. Sheet 37 may also be similarly processed as sheet 22 prior to its abutment against selectively coated sheet 22 by being selectively adhesive, or plastic coated and/or roller print decorated with registration between the two sheets (i.e., their coated and/or printed areas) being maintained by synchronizing the operational speed of all feed and printing or coating rollers or by generating feedback signals derived in scanning marks or the like printed on said sheets in registration with the other coating applied material and using said signals to correct the speed of the drive motors to effect such registration.

(II) A modified form of the apparatus of FIG. 4 may be utilized to effect the automatic fabrication of inflatable articles made of two sheets of flexible, electronically (radio frequency) weldable plastic. Roller means 26 may be used to roller print repeating designs on the bottom surface of sheet 22 which may comprise plasticized polyvinyl chloride or the like. Similar means may be disposed and operated to provide similar or other decorations on the upper surface of sheet 37 and means, as described, may be provided to abut the two sheets in a heat sealing or welding press (such as 43) with said printed decorations being substantially in alignment with each other so as to be correctly registered on both walls of the finished article. Press means 29 may be replaced by a heat sealing press including means for automatically feeding inflation valves to selected areas of sheet 22, individually passing the stems of said valves through respective holes die cut therein to accommodate said stems by a cutting means disposed in advance of said heat sealing press, forming part of said press or the printing means 26 so that holes so cut in sheet 22 will be in registration with the printing applied thereto by press 26. After the flange of the valve is welded or heat sealed to sheet 22, said sheet passes into abutment with sheet 37 whereafter the two pass into the heat sealing or electronic welding press 40 and are welded in a circumscribing weld line which is registered with the printing on either or both sheets. If the weld is a tear seal, the resulting articles may be automatically stripped off the sheet formation beyond the press 40 or further automatic die cutting means may be employed to effect such separation.

Means for controlling registration of the hereinabove described sheets with respect to the described forming, die-cutting, valve applying, sheet sealing and printing means so as to effect registration of the formations therein, printing, valves and sealing may be effected by means described in my said copending applications. Reference is also made to the October 1964 issue of Automation Magazine, on pages 66 to 71 of which are described a number of register control systems involving web scanning means responsive to marks applied during printing the main part of a sheet for effecting control of devices disposed off said sheet as hereinabove described.

I claim:

1. Packaging apparatus comprising in combination:
    (a) means for feeding a flat sheet of deformable material,
    (b) selective coating means disposed adjacent said feeding sheet for applying sealing material to selected areas of said flat sheet,
    (c) forming means operative to receive said sheet and form a plurality of indentations therein adjacent flat portions of said sheet coated with sealing material, and
    (d) cutting means operative to sever formed portions of said sheet each containing flat portions coated with sealing material.

2. Packaging apparatus in accordance with claim 1, including means operative to receive and stack the individual portions of said sheet cut from the main sheet.

3. Packaging apparatus in accordance with claim 2, said selective coating means comprising a roller press operative to printably apply adhesive material to said selected areas of said flat sheet.

4. Packaging apparatus in accordance with claim 1, said forming means including a press means having die means operative to advance against and retract from said sheet and synchronized in its operation to the operation of said coating means whereby the indentations in said sheet are predeterminately disposed with respect to said selectively coated areas of said sheet.

5. Packaging apparatus in accordance with claim 1, said sheet being a thermoplastic material, said forming means including means for thermally deforming said sheet with said plurality of indentations formed therein.

6. Packaging apparatus in accordance with claim 1, said coating means being operative to coat annular areas of said sheet with said sealing material, said forming means being operative to deform said sheet with indentations therein inward of said annular areas, said cutting means being operative to sever portions of said sheet each containing an indentation and a flange which is coated with said sealing means.

7. Apparatus in accordance with claim 1 in which said sealing material comprises a pressure sensitive, tacky adhesive, and means for guiding and laminating a sheet of protective material to the coated surface of the deformed sheet prior to cutting same.

8. Apparatus in accordance with claim 1, said coating means being operative to coat said sealing material on to band-like areas of said sheet which areas completely circumscribe the indentations formed in said sheet by said forming means and cover flange portions of said severed portions of said sheet.

9. Sheet fabricating apparatus comprising:
    (a) means for feeding a sheet of deformable material,
    (b) means for coating selected areas of said sheet with a sealing material,
    (c) forming means operative to receive said sheet and deform same with a plurality of indentations with each indentation predeterminately positioned with respect to coated areas of said sheet,
    (d) cutting means synchronized in its operation with said forming means to sever formed portions of said sheet from said sheet with each severed portion having at least one indentation and sealing material each predeterminately positioned on the severed portion.

10. Sheet fabricating apparatus in accordance with claim 9 including means for feeding a second sheet into abutment with said first sheet after said first sheet is formed and means, for bonding said second sheet to said first sheet by employing said selectively coated sealing material to effect said bonding.

11. Apparatus in accordance with claim 9, said means for coating selected areas of said sheet comprising means for applying a rubber-type adhesive to said selected areas, means for feeding a second sheet and applying a rubber-type adhesive to similar areas thereof as the selected areas of said first sheet, means for drying the adhesives of said two sheets and means for abutting the two sheets with the coated selected areas of both in substantial alignment with each other whereby the two sheets are adhesively bonded together, 12. Apparatus accordance with claim 9 in which said coating means is operative to coat sealing material in heat sealable plastic, and means for coating a second sheet of material with heat sealable plastic on selected areas thereof which are substantially similar to the selected areas of the first sheet so coated, means for feeding said second sheet into abutment with said first coated sheet with the coated areas of both in substantial alignment with each other and means for heat sealing the coatings on both said sheets together upon abutment with each other.

13. Apparatus for forming containers or the like comprising:
 (a) first means for feeding a continuous web of deformable material,
 (b) second means operative to selectively coat selected areas of a first surface of said web with sealing material which areas repeat with predetermined lengths of said web,
 (c) third means for forming said web adjacent said selected areas of said web into a plurality of cup-like indentations,
 (d) fourth means for feeding a second web of material into abutment with said first surface of said first web and for causing said second web to become sealed to those portions of said first web coated with said sealing material,
 (e) fifth means operative to cut selected portions of the abutted webs each containing at least one sealed assembly of said webs and an unsealed tab portion of said second web extending beyond the sealed portion so as to provide a means for separating the sealed portion of the webs by peeling action.

References Cited

UNITED STATES PATENTS

| | | | |
|---|---|---|---|
| 1,904,268 | 4/1933 | Bronson | 18—19 |
| 2,237,346 | 4/1941 | Gilfillan | 156—291 |
| 2,769,290 | 11/1956 | Harriman | 53—29 |
| 2,928,221 | 3/1960 | Smith | 53—183 |
| 2,970,414 | 2/1961 | Rohdin | 53—29 |
| 3,148,103 | 10/1964 | Gallagher | 156—245 |
| 3,192,091 | 6/1965 | Hey et al. | 156—309 |
| 3,221,472 | 12/1965 | Groth et al. | 53—184 |

DOUGLAS J. DRUMMOND, Primary Examiner

U.S. Cl. X.R.

53—184; 118—44; 156—548, 510